US005280873A

United States Patent [19]

Abrahamsen et al.

[11] Patent Number: 5,280,873

[45] Date of Patent: Jan. 25, 1994

[54] PLUNGER ARMATURE MAGNETIC ARRANGEMENT

[75] Inventors: John G. Abrahamsen, Nordborg; Michael Boisen, Kolding; Holger Nicolaisen, Nordborg, all of Denmark

[73] Assignee: Danfoss A/S, Nordborg, Denmark

[21] Appl. No.: 4,510

[22] Filed: Jan. 14, 1993

[30] Foreign Application Priority Data

Jan. 21, 1992 [DE] Fed. Rep. of Germany ....... 4201448

[51] Int. Cl.[5] .......... F16K 31/06

[52] U.S. Cl. .......... 251/129.15; 335/202; 335/278

[58] Field of Search .......... 251/129.15; 335/202, 335/278

[56] References Cited

U.S. PATENT DOCUMENTS 3,262,027 7/1966 Zaleske et al. .......... 251/129.15 X
3,593,241 7/1971 Ludwig .......... 335/278 X
3,757,263 9/1973 Saarem et al. .......... 251/129.15 X

FOREIGN PATENT DOCUMENTS 0110139 6/1984 European Pat. Off. .
0151563 8/1985 European Pat. Off. .

*Primary Examiner*—Arnold Rosenthal
*Attorney, Agent, or Firm*—Wayne B. Easton

[57] ABSTRACT

An electromagnetic valve assembly having a valve unit with a valve seat and a coil arrangement. An armature is slidably disposed in the bore of the coil arrangement. A yoke unit surrounding the coil arrangement is in two parts having cooperating longitudinally extending edges forming two axially extending air gaps on diametrically opposite sides of the yoke unit. End flange portions of the two parts of the yoke unit are cut to form articulated tabs which facilitate the forming of the flange end portions.

7 Claims, 1 Drawing Sheet

PLUNGER ARMATURE MAGNETIC ARRANGEMENT

Plunger armature magnetic arrangement

Figure 1:
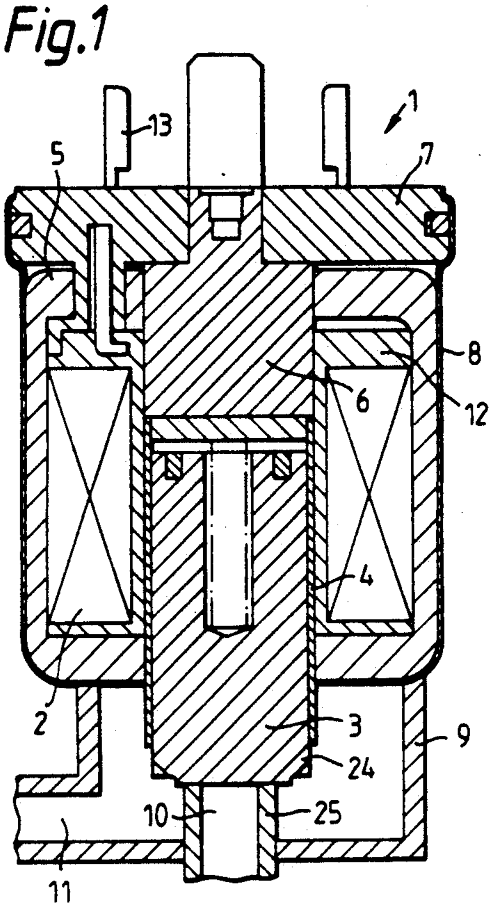

The invention relates to a plunger armature magnetic arrangement, in particular for an electromagnetic valve, with a coil, an armature, which is arranged in the coil so as to be axially movable, and a yoke enclosing the coil.

A plunger armature magnetic arrangement of that kind may have, in addition to the movable armature, a core head inserted immovably in the coil. The core head, yoke and armature together form a magnetic path.

A valve of that kind is known, for example, from DE 32 40 103 A1. In that case, the yoke is formed by a sheet metal sleeve, closed like a cup, into which the coil is inserted together with the core head and armature. The sleeve is crimped over at the edge, in order to give the coil a degree of fixing. The efficiency of this magnetic arrangement needs to be improved. This is firstly attributable to the fact that the gaps present in the magnetic path are relatively large. Secondly, eddy currents, which develop when switching on and off or during operation of the magnetic arrangement with alternating current, form in the circumferential direction, which leads to the magnetic arrangement being heated in an undesirable manner and to associated energy losses.

Furthermore, U.S. Pat. No. 2,829,860 discloses an electromagnetic valve in which a pot-like yoke surrounds the coil completely with the exception of one end face. The free end face is covered by a base, through which the armature is movable. Although the air gaps or spaces in the magnetic path are in this instance smaller, the eddy current losses can reach a considerable size.

The invention is based on the problem of providing a magnetic arrangement with a high attractive force and a good efficiency.

This problem is solved according to the invention in a plunger armature magnetic arrangement of the kind mentioned in the introduction in that the yoke is formed by several circumferential portions of a cylinder with partial cylinder end faces associated with each circumferential portion, the circumferential portions completely enclosing the coil and at their longitudinal edges forming air gaps with one another and the partial cylinder end faces closing a magnetic path in the region of the coil ends.

With a construction of that kind, the air gaps have at least a large component in the axial direction, that is, parallel with the main direction of the magnetic field in the yoke. Because the field must not bridge these air gaps, no energy needs to be expended in generating a through-flow in the air gap. On the other hand, the air gaps prevent eddy currents from forming in the circumferential direction. In the circumferential direction the yoke is interrupted as conductor for the eddy currents, namely, by the air gaps. The air gaps may be very narrow. It is sufficient for them to effect a galvanic separation between two yoke parts. In an extreme case, it is even sufficient for them to effect a sharp increase in the electrical resistance during transition from one yoke part to another. Because the coil is completely enclosed, utilisation of the yoke is as good as it is for the pot-shaped yoke. Virtually all of the yoke is available for the magnetic path. Because the partial cylinder end faces close the magnetic path, there is a very low magnetic resistance, which is comparable with that disclosed in U.S. Pat. No. 2,829,860. For that reason, really large magnetic forces can be generated to move the armature.

Advantageously, the yoke is formed by two substantially semi-cylindrical shells with corresponding end faces. This facilitates assembly quite considerably, since only two parts need to be manipulated in order to establish the magnetic path around the coil.

It is preferable for the air gaps to extend substantially axially. The effect of axially extending air gaps is that the path available to eddy currents is as short as possible. By that means eddy current losses are kept to a minimum. On the other hand, no gaps develop in the magnetic field at right angles to the field direction.

The yoke is advantageously formed from thin "dynamo" sheet[1] which has been subjected to a bending process. Because the yoke completely encloses the coil, in structural terms there is already quite a large area available for conduction of the magnetic field. A part of the cross-section of the yoke can therefore be dispensed with. The use of relatively thin sheet metal is therefore adequate. The use of dynamo sheet is recommended because it combines a high permeability with low conductance. The magnetic field is therefore promoted whereas the eddy currents are obstructed.

[1] Presumably magnetic sheet steel—translator.

In order further to improve the magnetic permeability of the yoke, it can be an advantage for the yoke to be formed from several layers of thin dynamo sheet. The permeance increases with the number of layers. The advantage of using several layers of sheet metal over using a thicker sheet metal is that the formation of eddy currents is checked. These are restricted essentially to the plane of the individual sheets of metal.

This effect is further reinforced if the individual layers are isolated electrically from one another. The eddy currents are then also unable to flow by way of contacts between individual sheet metal layers.

In an especially preferred embodiment, the circumferential portions are bent from plate-like blanks, the end faces being formed at each axial end by border region portions bent along a bending line and separated from one another by lines of separation which before the bending ran substantially axially. Plate-like blanks, in other words small plates of sheet metal, are therefore used as starting material. Cuts or other separating lines are made, for example by punching, at predetermined intervals in these sheet metal plates at the axial ends thereof, that is, at the ends that will subsequently be adjacent to the end faces, so that individual border region portions joined only along one line with the actual blank but separated from one another are formed. These border region portions can now be bent over so that the blank assumes the form of a "U" with relatively short arms. If this blank is now bent into a partial cylinder shape, that is, for example, into the shape of a half-cylinder, the bent border region portions are able to slide over one another. Without additional measures being required this produces an end face of which the thickness decreases from the inside outwards. This is especially advantageous because the magnetic field is at its strongest in the middle. Because the middle of the end faces of the yoke is thicker on account of the border region portions overlapping one another, it is exactly in this region that this greater field strength is distributed over a cross-sectional area that corresponds to the cross-sectional area of the cylinder jacket, so that saturation phenomena here are largely avoided. The reluctance is therefore not appreciably influenced by the higher magnetic field strength. Despite a compact construction, a high attractive and retentive force of the plunger armature is achieved thereby.

In an especially advantageous embodiment, provision is made for the bending lines to run at a predetermined angle to the circumferential direction. The individual border region portions then no longer lie in the same plane after the bending, but lie parallel to one another in planes which are inclined to the plane in which the border region portions would lie if the bending line were to run in the circumferential direction. This has the advantageous effect that the individual border region portions are displaced over one another as the blank is being bent without additional measures being required. This considerably simplifies the manufacturing process.

It is an advantage in this connection for the beginning of the bending line to be displaced relative to the end of the bending line of a neighbouring border region portion by a distance in the axial direction that corresponds substantially to the material thickness of the yoke. By that means, the individual border region portions are not only displaced over one another but essentially also come to lie one on top of the other. Unnecessarily large air gaps between the individual border region portions are thereby avoided.

To make the bending line at the desired angle, it is preferable for the border region portions to be rotated out of the plane of the blank about a substantially axial axis before they are bent. The border region portions are therefore somewhat twisted relative to the blank.

It is also preferable for openings and/or apertures for electrical connections and/or the armature or other parts of the magnetic path to be provided, and these are made in the circumferential portion once it has been bent or in the end face. In other words, the parts from which the yoke is assembled are first of all manufactured in their three-dimensional structure and then fine-machined to produce the individual openings and/or apertures.

It is an advantage for the openings and apertures to be punched out. This is a simple and inexpensive method of machining sheet metal.

Preferably, the yoke has pimple-like projections on its outside and is enclosed by a housing. The pimple-like projections mean that the housing does not lie in face-to-face contact with the yoke at all points. It is therefore able to exert a certain resilient action on the yoke. Tolerances in the air gaps can be compensated in this manner. In particular, these measures enable the yoke to lie in a radial direction at all points closely against the armature tube and the core head. Air gaps in this direction are therefore minimized or even substantially eliminated, so that a very good magnetic exposure[2] of the yoke is guaranteed.

[2] Presumably "Aussetzung" (exposure) is in error for "Ausnutzung" (exploitation, utilization)—translator.

The invention also relates to a process for the manufacture of a plunger armature magnetic arrangement in which a coil is arranged inside a yoke, the process being characterized in that the yoke is bent from a plate-like blank into the shape of a circumferential portion of a cylinder, border region portions at the axial ends of the blank being separated from one another by axial cuts prior to the bending and being bent along a bending line. On bending, not only is the cylindrical surface area or the corresponding portion thereof formed, but also the end faces of the yoke.

Preferably, the individual border region portions are rotated out of the plane of the blank about a substantially axially extending axis before the bending. During bending, a bending line inclined at a predetermined angle to the circumferential direction can then be produced without difficulty. As the plate-like blank is being bent, the individual border region portions position themselves one on top of the other and do not impede the bending process.

Figure 2:
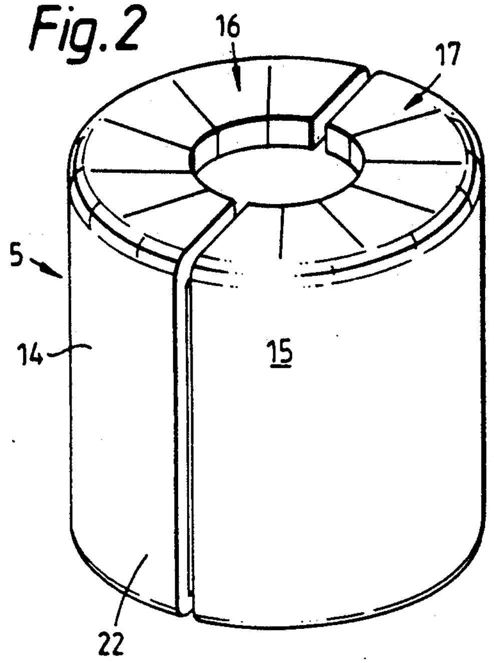
Figure 3:
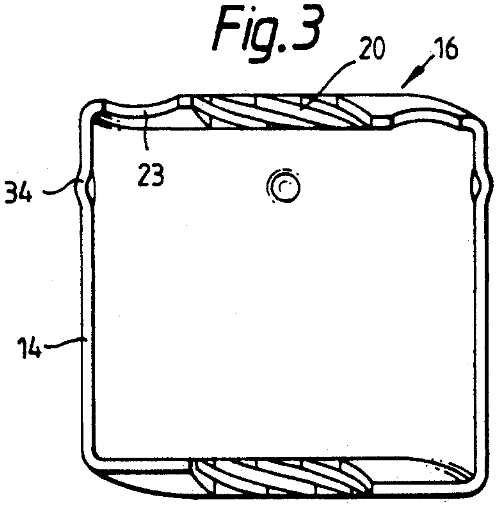
Figure 4:
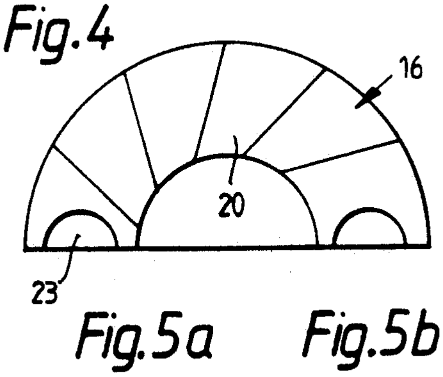

The invention is described hereinafter with reference to a preferred embodiment and in conjunction with the drawings, in which FIG. 1 shows a cross-section of a plunger armature magnetic arrangement, FIG. 2 shows the basic construction of a yoke, FIG. 3 shows a side view of a yoke half, FIG. 4 shows a plan view of the yoke half and FIGS. 5*a* to 5*e* shows individual steps in the process of manufacturing the yoke.

A plunger armature magnetic arrangement 1 comprises a coil 2 in which an armature 3 is mounted so as to be displaceable in an axial direction. The armature 3 can be mounted in an armature tube 4. The coil is completely surrounded by a yoke 5 in the circumferential direction. The yoke 5 is explained in detail in connection with FIGS. 2 to 5. A core head 6, on which a cover 7 is positioned, is inserted from above into the coil. The cover 7 is in its turn connected to a housing 8 which holds the yoke 5 and the coil 2 together. The housing 8 can be connected in known manner to a conduit system 9 so that the armature 3, or a closure member 24 fastened to it, which rests on a valve seat 25, separates an inlet 10 from an outlet 11, as illustrated in FIG. 1, or in the retracted position 3 of the armature leaves them free.

The coil 2 is arranged in a moulded body 12 through which the electrical connections 13 are guided. These are also lead to the outside through the cover 7.

Together with the core head 6 and the armature 3 the yoke 5 forms a magnetic circuit. For that purpose the yoke 5 lies closely against the core head 6. It also lies closely against the armature tube 4 so that there is only a very small air gap between the armature 3 and the yoke 5 in a radial direction.

The yoke 5 is of multi-part construction. It consists of several circumferential portions of a cylinder, in the case illustrated two semi-cylindrical shells 14, 15 with corresponding end faces 16, 17.

Figure 5A:
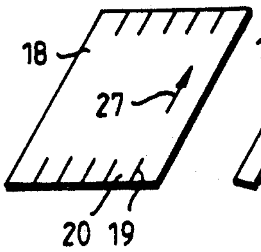
Figure 5B:
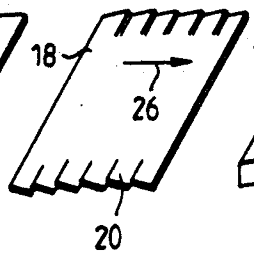
Figure 5C:
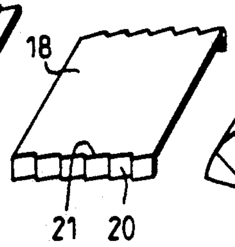
Figure 5D:
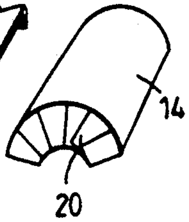

The construction of a yoke part 14, 15 is clear from the method of making the yoke part illustrated in FIGS. **5*a* to 5*e*. A plate-like blank 18 is provided at two axial edges with cuts 19. This produces border region portions which are separated from one another by the cuts 19 and are connected with the blank 18 only by way of a line-like connection. FIG. 5*b* illustrates how the individual border region portions 20 have been rotated out of the plane of the plate blank 18, namely, about an axis that is essentially parallel to the axial direction 27 of the subsequent cylinder surface. In other words, the border region portions 20 have been twisted in relation to the blank 18. When the individual border region portions 20 are now bent relative to the blank 18 (FIG. 5*c*) bending lines 21 are formed which are inclined at a predetermined angle relative to the circumferential direction 26 of the subsequent cylinder. The individual border region portions 20 no longer lie in the same plane. On the contrary, they are arranged parallel to one another, being inclined to the plane having the line of intersection with the plane of the blank 18 pointing in the circumferential direction 26. The individual bending lines 21 are arranged so that the end of one bending line is displaced with respect to the end of the adjacent bending line by a distance that corresponds approximately to the thickness of the material of the blank 18. When the blank 18 is bent to the partial cylindrical shape illustrated in FIG. 5d, the individual border region elements 20 are then displaced over one another without difficulty and come to rest one on top of the other, as evident from FIG. 3. In a final manufacturing step, the inner edges of the border region portions 20 can be punched out to give a circular shape, so that they fit the core head 6 or the armature tube 4 exactly and can be positioned thereon during assembly. Furthermore, pimple-like projections 34, which are shown only in FIG. 3**, are produced, for example, by pressing.

As is apparent from FIG. 3, the overlapping arrangement of the border region portions 20 produces a reinforcement or thickening of the end face 16 at its middle. This is precisely the region where the magnetic field produced by the coil 2 is at its strongest. There is an opportunity here for the magnetic field to spread over a relatively large cross-section. This cross-section corresponds to the cross-section of the circumferential portions 14, 15. Since the conduction cross-sections available for the magnetic field are the same everywhere, increases in resistance as a result of local saturation phenomena can largely be avoided.

The yoke 5 surrounds the coil 2 completely, and leaves air gaps 22 only between two adjacent circumferential portions 14, 15. These air gaps 22 have been shown on an exaggeratedly large scale in FIG. 2. In reality they are very much smaller. These air gaps 22 have two advantages. Firstly, they facilitate manufacture. A certain tolerance is provided here. Secondly, they reduce the development of eddy currents which are able to form when switching on and off an energizing current through the coil 2 or when using alternating currents to energize the coil 2. The eddy currents are unable to flow in a complete circuit. They are interrupted by the air gaps 22. The air gaps 22 also extend in an essentially axial direction, that is, parallel to the main direction of the magnetic field, so that they do not interrupt the magnetic field. Virtually no excitation power needs to be applied to excite a magnetic field in the air gap. The small region in the circumferential direction not available for the magnetic path is not critical. It has far less influence than an air gap of the same size that extends transversely to the flux direction of the magnetic field. Using the magnetic arrangement illustrated, much higher attractive or retentive forces can be achieved or, with the same attractive or retentive force, a weaker current can be used.

Figure 5E:
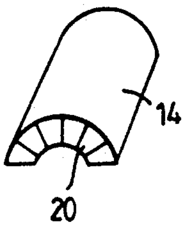

At the same time as the ends are processed, illustrated in FIG. 5e, apertures 23 for leading through the electrical connections 13, or other openings, can be formed. The individual border region portions 20 can also be caused to engage one another during punching. Although punching is the simplest form of machining, and can also be used to produce the cuts 19, other machining methods are possible, for example drilling or cutting.

The term "bending" is not restricted to the production of sharp angles. On the contrary, a certain rounding can be created as the border region portions 20 are bent. This is even desirable, in order to avoid too intense a compaction of the material of the yoke 5.

Dynamo sheet is preferably used as the material for the yoke 5. This dynamo sheet can be of relatively thin construction. Dynamo sheet combines the properties of a relatively good permeance, that is, a high permeability, with a relatively high electrical resistance. Since provision has already made in the construction for the magnetic resistance of the yoke 5 to be relatively low, small material thicknesses are adequate. If the material of the yoke 5 is required to be thicker, it is preferable for several thin layers of dynamo sheet to be placed one on top of the other; these individual layers can be electrically isolated from one another.

The yoke is held together by the housing 8 which electrically is virtually non-conducting and magnetically has the same or similar properties to air. The housing 8 presses chiefly on the projections 34 so that a certain resilient effect is provided. Tolerances in the air gaps 22 or around the armature tube 4 or the core head 6 can be evened out in this manner. The yoke 5 can be mounted very closely against the armature tube 4 and the core had 6.

We claim:

1. An electromagnetic valve assembly, comprising,
   a valve unit including a closure member and a valve seat,
   said valve unit including fluid inlet and outlet means having fluid communication with said valve seat and being controlled by said closure member,
   a coil arrangement including a coil unit defining a central bore and a yoke unit attached to and surrounding said coil unit,
   an armature slidably disposed in said coil unit central bore,
   said closure member being fixed to and movable with said armature,
   said yoke unit comprising two semi-cylindrically shaped parts having flange-like inwardly extending end portions, said parts having longitudinally extending edges in circumferentially spaced relation to form two axially extending air gaps on diametrically opposite sides of said yoke unit for closing a magnetic path in the regions of the ends of said coil unit.

2. An electromagnetic valve assembly according to claim 1 wherein said yoke unit is formed by two semi-cylindrical shells with corresponding end faces.

3. An electromagnetic valve assembly according to claim 1 wherein said air gaps extend substantially axially.

4. An electromagnetic valve assembly according to claim 1 wherein said end portions have openings for electrical connections.

5. An electromagnetic valve assembly according to claim 1 wherein said end portions are cut to form articulated tabs which are inwardly bent in respective radial planes to allow partial overlapping to facilitate the forming of said end portions.

6. An electromagnetic valve assembly according to claim 1 wherein a cover is attached to the end of said yoke unit remote from said valve seat, said cover having openings for the passage of electrical connections for said coil arrangement.

7. An electromagnetic valve assembly according to claim 6 including a housing shell surrounding said cover and said yoke unit, and small projections formed on said yoke unit to provide a press fit for said housing shell relative to said yoke unit.

* * * * *